United States Patent
Doty (10) Patent No.: US 7,863,572 B1
(45) Date of Patent: Jan. 4, 2011

(54) FRACTURE-RESISTANT LANTHANIDE SCINTILLATORS

(75) Inventor: F. Patrick Doty, Livermore, CA (US)

(73) Assignee: Sandia Corporation, Livermore, CA (US)

(*) Notice: Subject to any disclaimer, the term of this patent is extended or adjusted under 35 U.S.C. 154(b) by 357 days.

(21) Appl. No.: 12/174,761

(22) Filed: Jul. 17, 2008

Related U.S. Application Data (60) Provisional application No. 60/961,058, filed on Jul. 17, 2007, provisional application No. 60/962,696, filed on Jul. 30, 2007.

(51) Int. Cl.
*G01T 1/20* (2006.01)

(52) U.S. Cl. .................................. 250/361 R

(58) Field of Classification Search ............. 250/361 R, 250/370.01–370.15; 378/98.8; 252/301.17, 252/301.4 H
See application file for complete search history.

(56) References Cited

U.S. PATENT DOCUMENTS

| | | | |
|---|---|---|---|
| 5,039,858 A | 8/1991 | Anderson et al. |
| 6,437,336 B1 | 8/2002 | Pauwels |
| 6,818,896 B2 | 11/2004 | Pauwels |
| 7,060,982 B2 | 6/2006 | Ichinose |
| 7,067,815 B2 | 6/2006 | Dorenbos |
| 7,067,816 B2 | 6/2006 | Dorenbos |
| 7,084,403 B2 | 8/2006 | Srivastava |
| 7,129,494 B2 | 10/2006 | Shah |
| 2004/0000662 A1* | 1/2004 | Riman et al. .......... 252/301.4 R |

FOREIGN PATENT DOCUMENTS

WO 0160945 A2 8/2001

OTHER PUBLICATIONS

Kraemer et al., "Development and characterization of highly efficient new cerium doped rare earth halide scintillator materials," 2006, Journal of Materials Chemistry, vol. 16, pp. 2773-2780.*
Lee et al., "Comparative measurements on LaBr3(Ce) and LaCl3(Ce) scintillators coupled to PSPMT," 2005, IEEE Transaction on Nuclear Science, vol. 52, No. 4, pp. 1119-1122.*
T. Kataoka; T. Yamada; "Yield Strength and Dislocation Mobility of KCl-KBr Solid Solution Single Crystals", Japanese Journal of Applied Physics, 1977, vol. 16, No. 7, pp. 1119-1126.

(Continued)

*Primary Examiner*—David P Porta
*Assistant Examiner*—Kiho Kim
(74) *Attorney, Agent, or Firm*—Timothy P. Evans (57) ABSTRACT

Lanthanide halide alloys have recently enabled scintillating gamma ray spectrometers comparable to room temperature semiconductors (<3% FWHM energy resolutions at 662 keV). However brittle fracture of these materials upon cooling hinders the growth of large volume crystals. Efforts to improve the strength through non-lanthanide alloy substitution, while preserving scintillation, have been demonstrated. Isovalent alloys having nominal compositions of comprising Al, Ga, Sc, Y, and In dopants as well as aliovalent alloys comprising Ca, Sr, Zr, Hf, Zn, and Pb dopants were prepared. All of these alloys exhibit bright fluorescence under UV excitation, with varying shifts in the spectral peaks and intensities relative to pure $CeBr_3$. Further, these alloys scintillate when coupled to a photomultiplier tube (PMT) and exposed to $^{137}Cs$ gamma rays.

18 Claims, 12 Drawing Sheets

OTHER PUBLICATIONS

G. W. Iseler; H. R. Clark, Jr.; "Horizontal Gradient-Freeze Growth of InP Crystals Under Controlled Pressure", Indium Phosphide and Related Materials, 1990, Second International Conference, pp. 25-29.

M. J. Harrison; F. P. Doty; "Initial Investigation of Strengthening Agents for Lanthanide Halide Scintillators", Proceedings of the SPIE, 2007, vol. 6707, pp. 67070B-1-67070B-10.

K. O. Findley; J. Johnson; D. F. Bahr; F. P. Doty; J. Frey; "Fracture and Deformation Behavior of Common and Novel Scintillating Single Crystals", Proceedings of the SPIE, 2007, vol. 6707, pp. 670706-1-670706-12.

F. P. Doty; D. McGregor; M. Harrison; K. O. Findley; R. Polichar; "Structure and Properties of Lanthanide Halides", Proceedings of the SPIE, 2007, vol. 6707, pp. 670705-1-670705-11.

E. M. Nadgornyi; "Dislocation Dynamics and Mechanical Properties of Crystals", 1988, vol. 3, pp. 1-530.

* cited by examiner

FRACTURE-RESISTANT LANTHANIDE SCINTILLATORS

CROSS REFERENCE TO RELATED APPLICATIONS

This application claims priority to provisional U.S. Patent Application Ser. No. 60/961,058 originally filed Jul. 17, 2007 entitled "New Scintillator Compositions" and to provisional U.S. Patent Application Ser. No. 60/962,696 originally filed Jul. 30, 2007 entitled "Lanthanide Halide Scintillator Compositions" from which benefit is claimed.

STATEMENT OF GOVERNMENT SUPPORT

The United States Government has a paid-up license in this invention and the right in limited circumstances to require the patent owner to license others on reasonable terms as provided for by the terms of contract No. DE-AC04-94AL85000 awarded by the U.S. Department of Energy to Sandia Corporation.

BACKGROUND OF THE INVENTION

1. Field of the Invention

The present invention generally relates to a material composition used in detecting ionizing radiation, particularly gamma-ray and X-ray radiation, and methods for toughening crystals of these materials, as the crystals are grown. More particularly, the present invention relates to improved lanthanide halide compositions that introduce structural perturbations in the crystal lattice to toughen the crystal against formation of critical flaws along cleavage planes of the crystal.

Scintillators are materials that emit flashes or pulses of light when they interact with ionizing radiation. Scintillator crystals are widely used in detectors for gamma-rays, X-rays, cosmic rays, and particles characterized by an energy level of greater than about 1 keV. It is possible to make radiation detectors, therefore, by coupling the crystal with some means for detecting the light produced by the crystal when it interacts, or "scintillates," when exposed to a source of radiation. The photo-detector produces an electrical signal proportional to the intensity of the light pulses received.

2. Related Art

A number of the scintillator materials in current use possess most of the important properties that define these materials as useful: properties such as high light output, high cross-section, short decay times, and minimum afterglow. Prior art examples used for many years include thallium-activated sodium iodide (NaI(T1)), bismuth germanate (BGO), cerium-doped gadolinium orthosilicate (GSO), and cerium-doped lutetium orthosilicate (LSO).

While each of these materials exhibit properties which are suitable for many applications, each also has its shortcomings. Problems such as mediocre light yield, poor physical strength, and the difficulty and expense of producing large, high quality crystals continue to plague the industry. Moreover, non-proportional light yield seriously limits spectroscopic performance of these materials.

A number of lanthanide-halide compounds have recently been described as promising scintillators to address the problem of light yield and proportional response. In particular:

U.S. Pat. Nos. 6,437,336 and 6,818,896 describe a monoclinic single crystal with a lutetium pyrosilicate structure. The crystal is formed by crystallization from a congruent molten composition of $Lu_{2(1-x)}M_{2x}Si_2O_7$ where Lu is lutetium or a lutetium-based alloy which also includes one or more of scandium, ytterbium, indium, lanthanum, and gadolinium; where M is cerium or cerium partially substituted with one or more of the elements of the lanthanide family excluding lutetium; and where x is defined by the limiting to level of Lu substitution with M in a monoclinic crystal of the lutetium pyrosilicate structure. The crystals are said to exhibit excellent and reproducible scintillation response to gamma radiation.

U.S. Pat. No. 7,060,982 describes a fluoride single crystal for detecting radiation having high luminescence intensity. The fluoride single crystal contains Ce and at least one element ($R^1$) of Lu and Gd, wherein the single crystal is represented by the general formula $Ce_{1-x}R^1_xF_3$ where $0.001 < x. < 0.5$.

U.S. Pat. No. 7,067,815 describes an inorganic scintillator material, a method for growing a single crystal of the scintillator material. The inorganic scintillator material has the general composition $M_{1-x}Ce_xCl_3$, where M is selected among lanthanides or lanthanide mixtures, preferably among the elements or mixtures of elements of the group consisting of Y, La, Gd, Lu, in particular among the elements or mixtures of elements of the group consisting of La, Gd and Lu; and x is the molar rate of substitution of M with cerium, x being not less than 1 mol % and strictly less than 100 mol %.

U.S. Pat. No. 7,067,816 describes an inorganic scintillator material of general composition $M_{1-x}Ce_xBr_3$, wherein: M is selected among lanthanides or lanthanide mixtures of the group consisting of La, Gd, Y in particular among lanthanides or lanthanide mixtures of the group consisting of La, Gd; and x is the molar rate of substitution of M with cerium, x being not less that 0.01 mol % and strictly less than 100 mol %.

U.S. Pat. No. 7,084,403 describes scintillator materials based on certain types of halide-lanthanide matrix materials are described. In one embodiment, the to matrix material contains a mixture of lanthanide halides, i.e., a solid solution of at least two of the halides, such as lanthanum chloride and lanthanum bromide. In another embodiment, the matrix material is based on lanthanum iodide alone, which must be substantially free of lanthanum oxyiodide. The scintillator materials, which can be in monocrystalline or polycrystalline form, also include an activator for the matrix material, e.g., cerium.

U.S. Pat. No. 7,129,494 describes fast scintillator materials capable of resolving the position of an annihilation event within a portion of a human body cross-section. In one embodiment, the scintillator material comprises $LaBr_3$ doped with cerium. Particular attention is drawn to $LaBr_3$ doped with a quantity of Ce that is chosen for improving the timing properties, in particular the rise time and resultant timing resolution of the scintillator, and locational capabilities of the scintillator.

The foregoing compounds, however, do not address the issue of crystal strength nor do they address the issue of producing large, fracture-resistant or crack-free single crystals. However, the lanthanide halides are generally soft, compliant crystals which would suggest that strength would not be an issue with these crystals. However, while soft, crystals of these materials are also highly anisotropic with a strong preference for slip along on hexagonal prismatic planes. We believe that slip on these prismatic planes results in dislocation pile-ups and critical-sized flaws that intensify the stress leading to cleavage fracture on these same planes. Lanthanide halide scintillators form hexagonal crystals in the uranium (III) chloride prototype structure, which is characterized by 9-fold coordination of to the cation, low c/a ratio, and open channels along the c axis. These materials while relatively "soft" tend to be very brittle, and fracture by cleavage along their prismatic planes, orthogonal to the c or basal plane. Analysis of this structure indicates dislocation formation energies and mobilities on these same prismatic planes are highly favored relative to the more usual basal plane slip; that is, the slip and cleavage planes are identical. This structure is therefore highly susceptible to cracking during crystal growth and subsequent detector fabrication.

Growth of lanthanide halide crystals is presently accomplished through various melt-solidification methods, wherein the crucible, or "boat," of molten material is directionally cooled to nucleate and grow a crystal boule. Failure of the lattice due to critical flaws introduced by plastic strain is most likely during crystal growth or cool-down, due to the resultant longitudinal or radial thermal gradients within the crystal. Furthermore, the problem is exacerbated by anisotropy in the thermal expansion coefficient that is considerably larger in the [10•0] or a directions than in the [00•1] or c direction. Along the c-axis, thermal expansion occurs rather slowly at $7.5 \times 10^{-6}$ $C^{-1}$, while expanding far faster along the a-axis at approximately $28.1 \times 10^{-6}$ $C^{-1}$. This anisotropy in thermal expansion results in the formation of significant shear stresses on the prismatic [00•1] planes whenever a thermal gradient is applied more than 10° off the c-axis. We believe this anisotropy results in dislocation formation and motion and the formation of critical stress-concentrating flaws on these (weakest) planes of the crystal that subsequently lead to brittle fracture or cleavage. This, in combination with the propensity of these crystals to cleave along their slip planes, has been the chief impediment in achieving the necessary availability of large, cost effective to crystals.

Therefore, there remains an unmet need for providing a means for toughening lanthanide halides scintillating crystal compositions.

SUMMARY

Lanthanide halides form generally "soft," compliant crystals which would suggest that strength should not be an issue. Nonetheless, cracking is a serious and as yet unsolved problem when attempting to grow lanthanide halide crystals of several inches in length. The prior art compounds do not address the issue of increased crystal strength nor do they address the issue of producing fracture-resistant single crystals.

There remains then an unmet need for providing a means for toughening lanthanide halides. To meet this need we have undertaken to identify agents to strengthen the lanthanide halide lattice without negatively impacting the scintillation properties.

Therefore, it is an object of this present invention to provide a material composition from which fracture-resistant single crystals may be grown and which is also exhibits useful scintillation characteristics.

In one embodiment of this invention a method is provided for inducing a strengthening effect in lanthanide-halide single crystals without compromising the scintillation effect of these materials.

In another embodiment of the invention is a chemical composition comprising one or several suitable atomic species outside of the lanthanide series which, when incorporated into the lattice of a lanthanide-halide single crystal, induces sufficient strain the to lattice to reduce slip along on hexagonal prismatic planes within the crystal.

In still another embodiment of the invention ions having atomic radii and/or valences that are different from the atomic radius and/or valence of a host lanthanide-halide crystal are incorporated into the crystal.

In yet again embodiment of this invention ions having nearly the same atomic radii and/or valence as the host lanthanide-halide crystal are incorporated into the crystal.

In still another embodiment of the invention a lanthanide-halide scintillator is "doped" with a salt of an ion selected from any of Groups 2-5 or 12-14 of the new IUPAC Groups of the Periodic Table of the Elements.

Still further embodiment of the invention provides a means for enhancing the UV fluorescence response of a lanthanide-halide crystal.

Therefore, it is a further object of this invention to provide alloying element(s) for strengthening the lanthanide-halide crystals that do not degrade the crystal scintillation properties.

Both the foregoing general description and the following detailed description are exemplary and explanatory only and are intended to provide further explanation of the invention as claimed. The accompanying drawings are included to provide a further understanding of the invention and are incorporated in and constitute part of this specification, illustrate several embodiments of the invention, and together with the description serve to explain the principles of the invention.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE EMBODIMENTS

Existing scintillation materials typically use only lanthanide and halogen atoms to form an isomorphous crystal designed for high gamma ray cross sections and scintillation light yield. The improved material incorporates cations from outside the lanthanide series which strengthen the material through lattice strains caused by differing atomic radii and/or valence. Our solution to the problem of fracture in large, single crystals of lanthanide scintillators is somewhat counterintuitive because high fracture toughness is generally related to higher plasticity and, as noted earlier, lanthanide-halide crystals are relatively soft and compliant. However, in this specific case we have demonstrated that decreasing the to plasticity of these crystals also improved their fracture toughness by blocking the formation of critical flaws within the strained crystal lattice. Moreover, while investigating various alloying agents we found a serendipitous effect, wherein alloying the scintillation crystal with trivalent cations also enhanced the fluorescence and scintillation light yield of the parent material.

Three methods are generally useful for strengthening crystalline materials. These include mechanical work hardening, particle strengthening, and solid-solution hardening (i.e., alloying with impurity atoms). However, while lanthanide-halide crystals are, relatively-speaking, soft and compliant, they exhibit limited plasticity and are too brittle for the first two of these methods to be used successfully. Furthermore, the scintillating properties of these crystals are of primary importance and the introduction of particles into a scintillator can be expected to scatter and/or absorb light, thereby degrading scintillation performance. These strengthening methods are therefore impractical for generating large, high quality scintillation crystals.

Figure 1A:
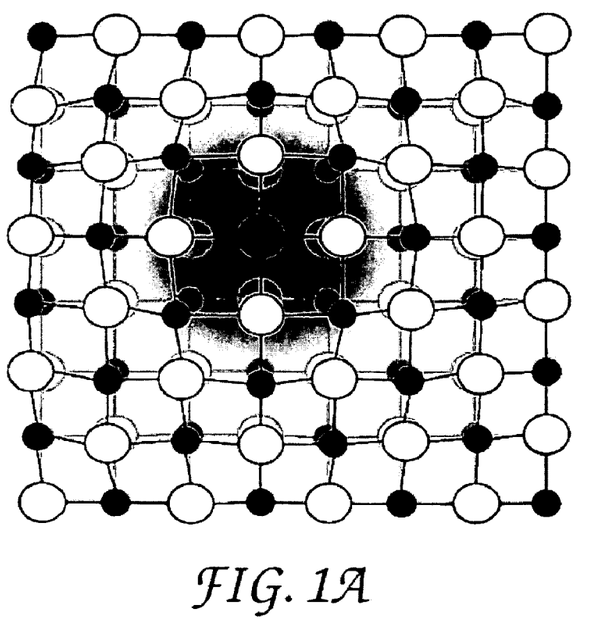
FIG. 1A shows a schematic representation of a region of a crystal lattice strained by the introduction of an isovalent cation with an ionic radius slightly larger than the surrounding host cations.
Figure 1B:
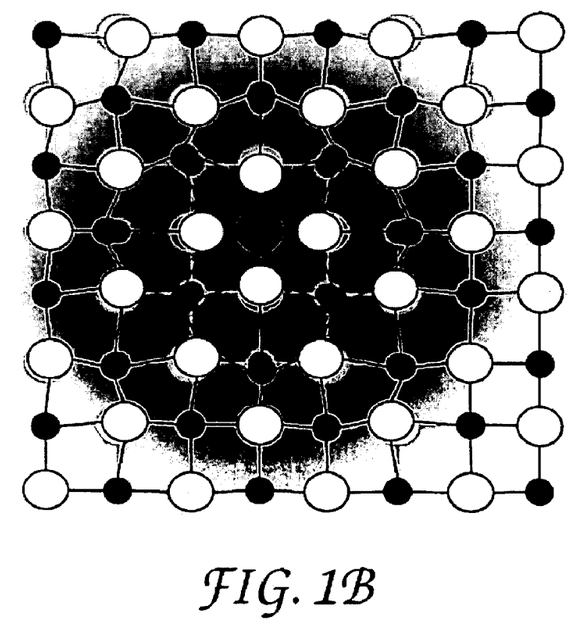
FIG. 1B shows a schematic representation of a region of a crystal lattice strained by the introduction of a aliovalent cation having a net positive charge with respect to the surrounding host cations together with an ionic radius slightly larger than the host cations.

Therefore, only solid-solution hardening remains as a viable alternative for strengthening lanthanide-halide crystals. Two different approaches to solute substitution are possible. The first comprises substituting an atom of the same valence (isovalent) but having a larger ionic radius than the host lattice is substituted into the crystal lattice. This substitution introduces short range strain in the crystal structure surrounding it as illustrated schematically in FIG. 1A. The second comprises substituting an atom having a different valence (aliovalent) but having a similar ionic radius as the host lattice. This second to substitution introduces longer range strain in the crystal structure as illustrated schematically in FIG. 1B. The technique has long been known to harden metals by forming alloys through the substitution of host atoms for impurity atoms having atomic radii or valences which differ from the surrounding host solute material. However, forming alloys of dissimilar members of the lanthanide series is unlikely to provide much strengthening due to the similarity in size of the ionic radii of the members of the series. Instead, alloys using non-lanthanide cations as the impurity species would be expected to induce a strengthening effect within a host crystal since these species exhibit large differences in ionic radii from that of the members of the lanthanide series.

Both approaches strain the underlying crystal lattice but the effect is most marked in aliovalent substitution in that only several hundred parts-per-million (ppm) are necessary to dramatically alter the minimum stress required to initiate slip on a given slip plane within a crystal (known as the critical resolved shear stress, or "CRSS"). In particular, it is known that the IUPAC Group 2, 4, 12, and 14 cations have a marked effect on the mechanical properties of ionic crystals doped with these materials, on a per-mole basis. For example, ppm level impurities can have a dramatic effect on dislocations and plasticity in alkali halide crystals (Nadgornyi, E, "Dislocation Dynamics and Mechanical Properties of Crystals," *Progress in Materials Science,* 1988, v.31: pp. 1-530).

Figure 2A:
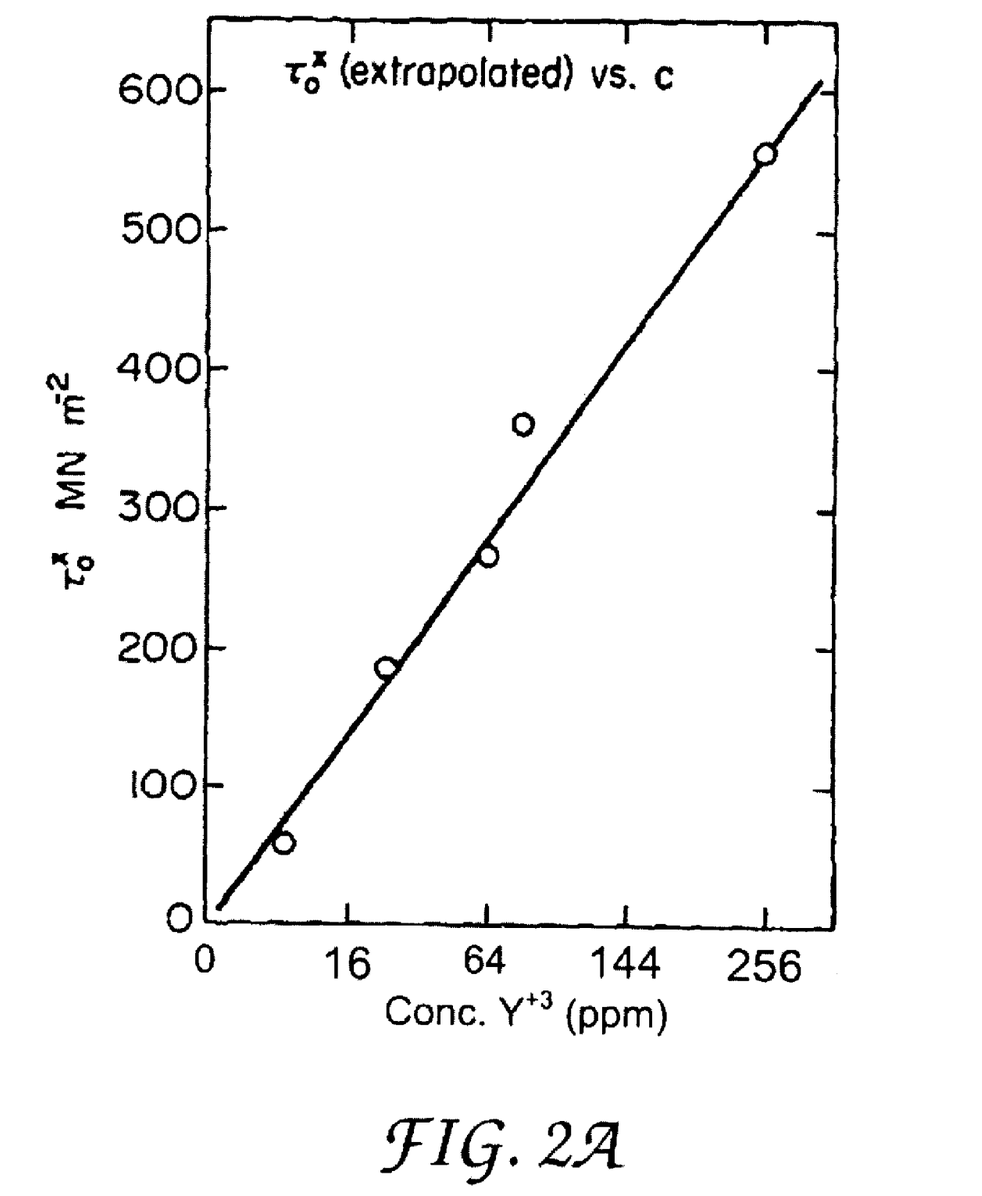
FIG. 2A graphically illustrates the effect on the resolved shear stress within $CaF_2$ crystal lattice with the introduction of small amounts of $Y^{3+}$ dopant cations and that only about 250 ppm dopant concentration is necessary to change the shear stress by a factor of 10.
Figure 2B:
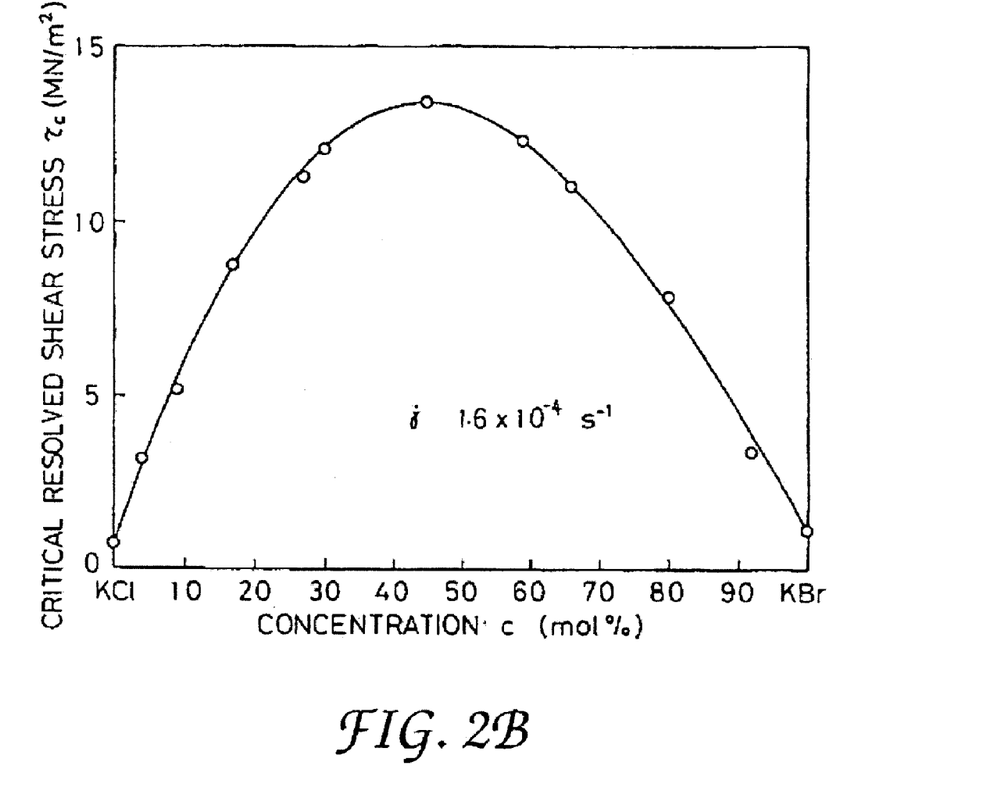
FIG. 2B shows the effect on the resolved shear stress within KBr crystal lattice with the introduction of KCl and illustrating the substantial quantities of substitution necessary for a 10-fold increase in shear stress

By comparison, to achieve the same effect using isovalent substitution one would need to introduce tens of percent of the substituted constituent into the crystal lattice. A comparison of the two effects is shown graphically in FIGS. 2A and 2B, wherein roughly 250 ppm of $Y^{3+}$ substituted into $CaF_2$ increases the critical resolved shear stress (CRSS) by to an order of magnitude (M. N. Sinha and P. S. Nicholson, *Journal of Materials Science,* 1977, v.12: pp. 1451-1462) while it is necessary to add about 20 mol % KBr to a KCl crystal lattice in order to improve the alloy CRSS by a similar amount (T. Kataoka and T. Yamada, *Japanese Journal of Applied Physics,* 1977, v.16: pp. 1119-1126).

Several isovalent and aliovalent dopants were screened as strengthening agents in cerium bromide ($Ce(III)Br_3$) scintillators. Each alloy was screened on basic properties such as presence of scintillation and emission spectra in order to determine whether the presence of the strengthening agents in any way effected the scintillation in $CeBr_3$. A detailed description of this investigation and its results are provided below.

EXAMPLES

Sample Preparation

Initial tests were performed with small 400-600 mg samples of each alloy as well as a control sample of pure $CeBr_3$ in order to test for degrading effects on crystal fluorescence. Twelve (12) crystals were grown using cerium bromide doped with various cations and their fluorescence spectra measured. The test samples were prepared by weighing out the necessary masses of each component in bead or powder form in a nitrogen glove box. Actual sample weights are given in TABLE 1 below. The powders were then placed in 5 in. long, ¼" OD quartz tubes each having had one of its ends previously flame sealed. After loading the material into the tubes the open end of each tube was attached to a vacuum system with an Ultra-Torr fitting, evacuated to less than $1\times10^{-3}$ Torr, and then flame sealed approximately 1-2" above the level of the powders. Each of the sealed ampoule and sample was then individually placed upright into a bench top tube furnace and rapidly heated to 950° C.: just above the highest melting point of the constituent compounds. The samples were held at temperature for 12 hours to allow time for the alloy constituents to mix and homogenize, after which each was cooled to room temperature at a rate of about 1° C./min. The finished samples were noted to be very polycrystalline.

TABLE 1

Component masses of alloy samples.

| Sample | Dopant | Cation Substitution State | Mass of $CeBr_3$ (mg) | Mass of Dopant (mg) | Molar Fraction Dopant (%) |
|---|---|---|---|---|---|
| 1 | $AlBr_3$ | Isovalent | 363.2 | 41.1 | 13.9 |
| 2 | $GaBr_3$ | Isovalent | 348.5 | 26.7 | 8.6 |
| 3 | $ScBr_3$ | Isovalent | 352.6 | 33.7 | 11.3 |

TABLE 1-continued

Component masses of alloy samples.

| Sample | Dopant | Cation Substitution State | Mass of CeBr$_3$ (mg) | Mass of Dopant (mg) | Molar Fraction Dopant (%) |
|---|---|---|---|---|---|
| 4 | YBr$_3$ | Isovalent | 345.0 | 82.6 | 21.7 |
| 5 | InBr$_3$ | Isovalent | 427.5 | 40.6 | 9.2 |
| 6 | CaBr$_2$ | Aliovalent | 534.4 | 3.8 | 1.3 |
| 7 | SrBr$_2$ | Aliovalent | 620.7 | 5.4 | 1.3 |
| 8 | ZnBr$_2$ | Aliovalent | 440.7 | 2.9 | 1.1 |
| 9 | CdBr$_2$ | Aliovalent | 434.4 | 2.1 | 0.7 |
| 10 | PbBr$_2$ | Aliovalent | 452.5 | 3.9 | 0.9 |
| 11 | ZrBr$_4$ | Aliovalent | 589.0 | 4.7 | 0.7 |
| 12 | HfBr$_4$ | Aliovalent | 470.1 | 7.5 | 1.2 |

Some differences were found in the fluorescence performance between the control sample and the prepared alloys listed in TABLE 1 as will be discussed later. Preliminary gamma ray spectroscopy results indicate no degradation in energy resolution is incurred by doping.

Because some impurity species can "quench" scintillation we wished to introduce as little impurity elements to the host lattice as possible. The preferred embodiment of the invention, therefore, uses cerium bromide alloyed with (aliovalent) divalent and tetravalent cations. The formulations listed below were prepared by the method described above except that the samples were prepared from ingot-sized quantities of powders and grown via the horizontal Bridgman method in an electrodynamic gradient furnace. The dopants used included CaBr$_2$, SrBr$_2$, BaBr$_2$, ZrBr$_4$, HfBr$_4$, ZnBr$_2$, CdBr$_2$, and PbBr$_2$. All ingots were prepared under vacuum or in an inert atmosphere.

More than 25 ingots were grown in this way. Each ingot was nominally doped with one of the several identified dopants at a concentration of 250 ppm, 500 ppm, or 1000 ppm. Preliminary ingots were grown in 25 mm ID ampoules, but recent upsizing results indicate the growth method scales easily to 34 mm ID ampoules. Single D-shaped crystals over 200 mm in length and 34 mm in diameter have been achieved. Nearly every ingot exhibited a single-crystal cross-section at the tail. Samples from each alloy were harvested from the as-grown crystals by either cleaving or cutting with a diamond wire saw.

The formulations that were prepared are listed below in Tables 2A and 2B.

TABLE 2A

Component masses of alloy samples having divalent cation dopants.

| Sample | Dopant | Mass of CaBr$_3$ (g) | Mass of Dopant (mg) | Molar Fraction of Dopant (10$^{-6}$) |
|---|---|---|---|---|
| 1 | CaBr$_2$ | 150.005 | 44.0 | 557 |
| 3 | SrBr$_2$ | 149.900 | 49.0 | 501 |
| 6 | ZnBr$_2$ | 139.951 | 45.0 | 542 |
| 7 | CdBr$_2$ | 140.016 | 51.4 | 512 |
| 8 | PbBr$_2$ | 139.720 | 74.9 | 554 |
| 9 | SrBr$_2$ | 140.317 | 104.7 | 1144 |
| 12 | ZnBr$_2$ | 140.008 | 91.2 | 1098 |
| 13 | CdBr$_2$ | 140.065 | 101.4 | 1009 |
| 14 | CaBr$_2$ | 140.007 | 21.3 | 289 |
| 16 | BaBr$_2$ | 140.099 | 55.3 | 504 |
| 17 | SrBr$_2$ | 140.001 | 32.9 | 361 |
| 20 | ZnBr$_2$ | 140.024 | 28.8 | 347 |
| 21 | CdBr$_2$ | 140.003 | 53.2 | 530 |
| 22 | BaBr$_2$ | 140.017 | 90.2 | 823 |

TABLE 2A-continued

Component masses of alloy samples having divalent cation dopants.

| Sample | Dopant | Mass of CaBr$_3$ (g) | Mass of Dopant (mg) | Molar Fraction of Dopant (10$^{-6}$) |
|---|---|---|---|---|
| 23 | CaBr$_2$ | 140.026 | 68.8 | 933 |
| 24 | SrBr$_2$ | 500.0 | 163.0 | 500 |

TABLE 2B

Component masses of alloy samples having tetravalent cation dopants.

| Sample | Dopant | Mass of CaBr$_3$ (g) | Mass of Dopant (mg) | Molar Fraction of Dopant (10$^{-6}$) |
|---|---|---|---|---|
| 18 | ZrBr$_4$ | 140.031 | 39.1 | 258 |
| 19 | HfBr$_4$ | 140.014 | 49.4 | 269 |
| 4 | ZrBr$_4$ | 149.900 | 94.1 | 580 |
| 5 | HfBr$_4$ | 139.964 | 105.2 | 573 |
| 10 | ZrBr$_4$ | 140.033 | 156.4 | 1032 |
| 11 | HfBr$_4$ | 140.084 | 171.5 | 933 |

Figure 3A:
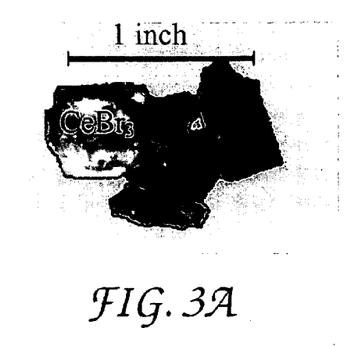
FIG. 3A illustrates the cerium (III) bromide crystal "rubble" typically obtained following crystal cool-down.
Figure 3B:
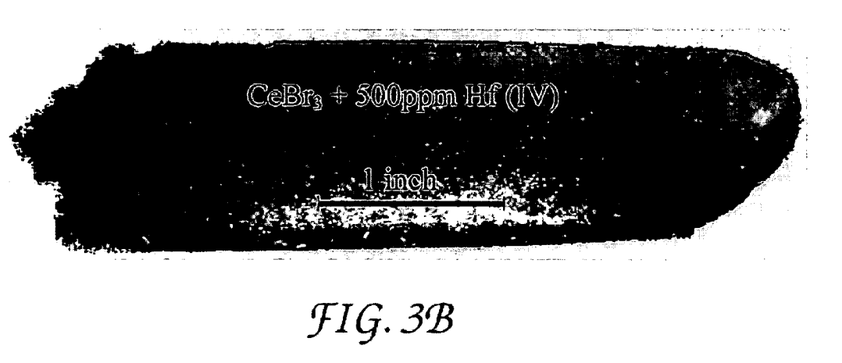
FIG. 3B shows a photograph of a cerium (III) bromide crystal doped with 500 to ppm of hafnium (IV) cations.
Figure 3C:
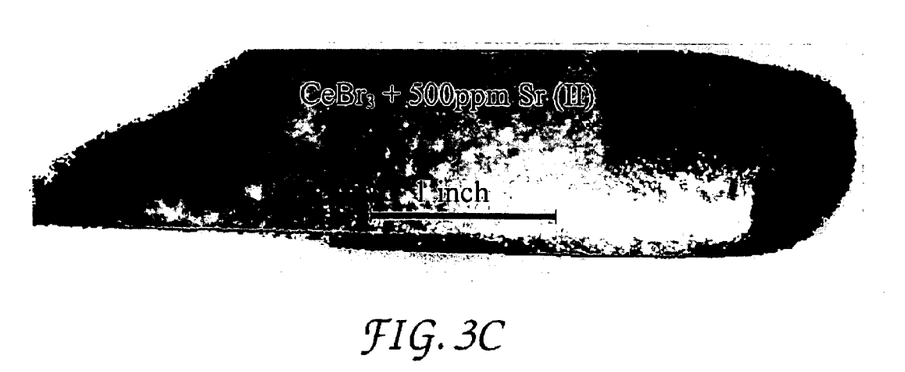
FIG. 3C shows a photograph of a cerium (III) bromide crystal doped with 500 ppm of strontium (II) cations.
Figure 4:
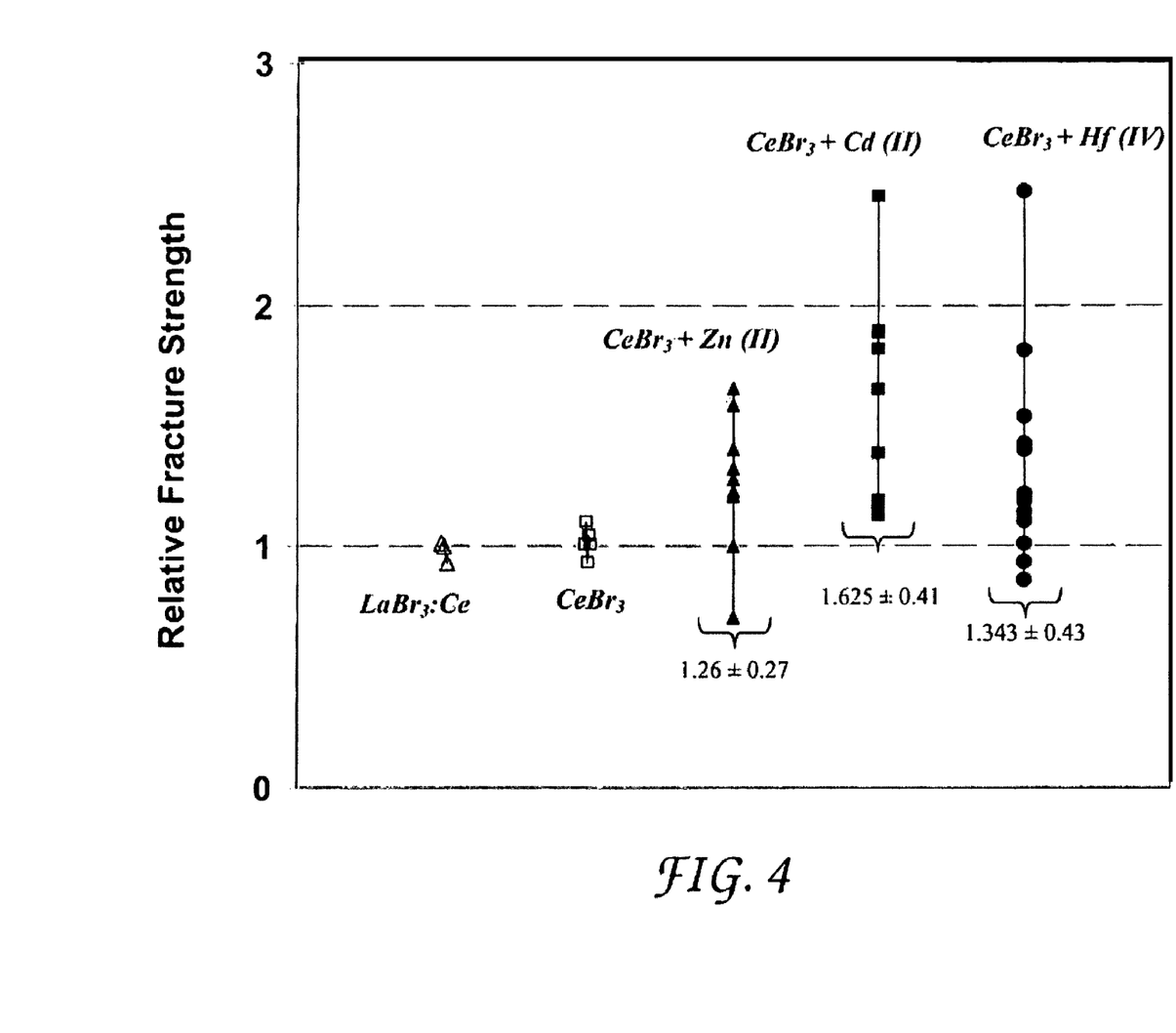
FIG. 4 shows a graphical comparison of a number of Vickers microhardness tests of doped and undoped lanthanide-halide crystals and illustrating the increase in strength typically obtained by this technique.
Figure 5A:
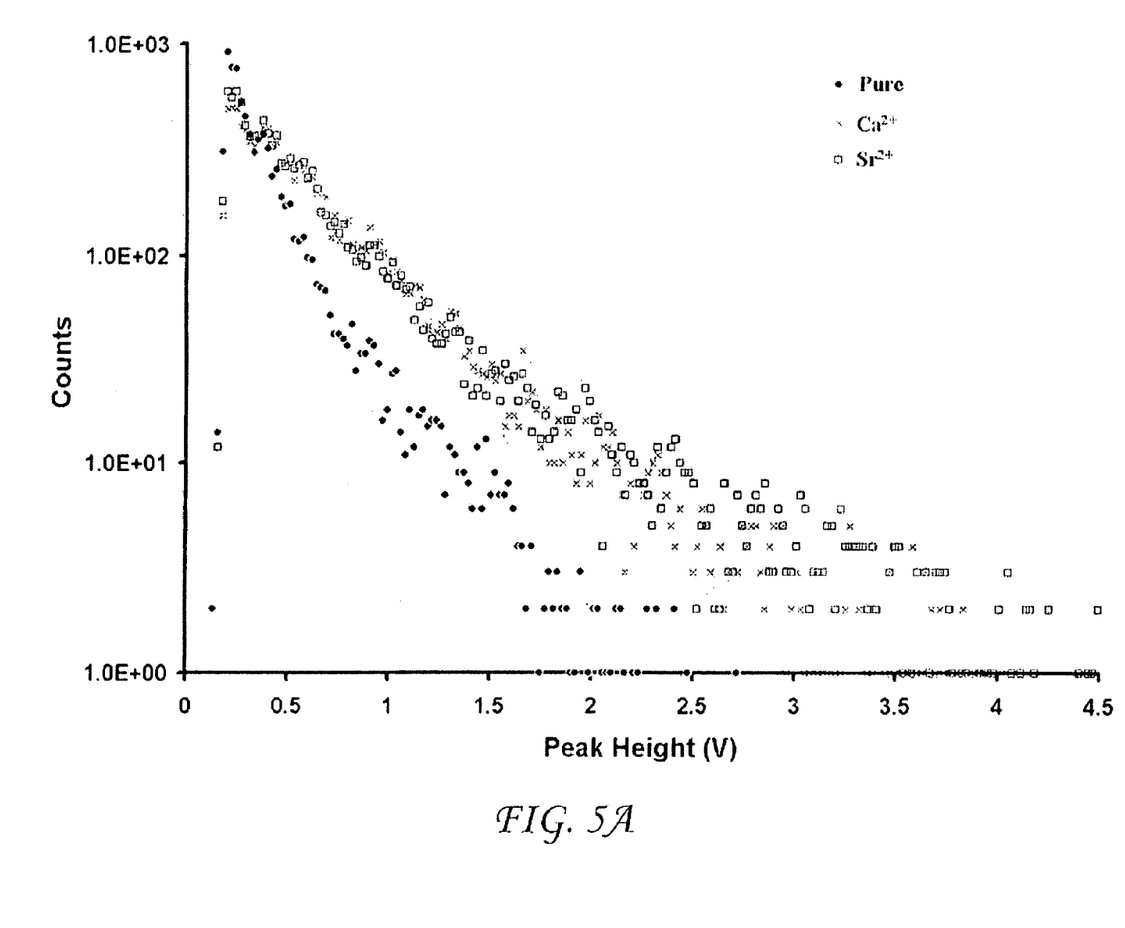
FIGS. 5A-F show the emission response of isovalent or aliovalently doped crystals to both UV and the unexpected increase in response seen in most doped crystal formulations.
Figure 5B:
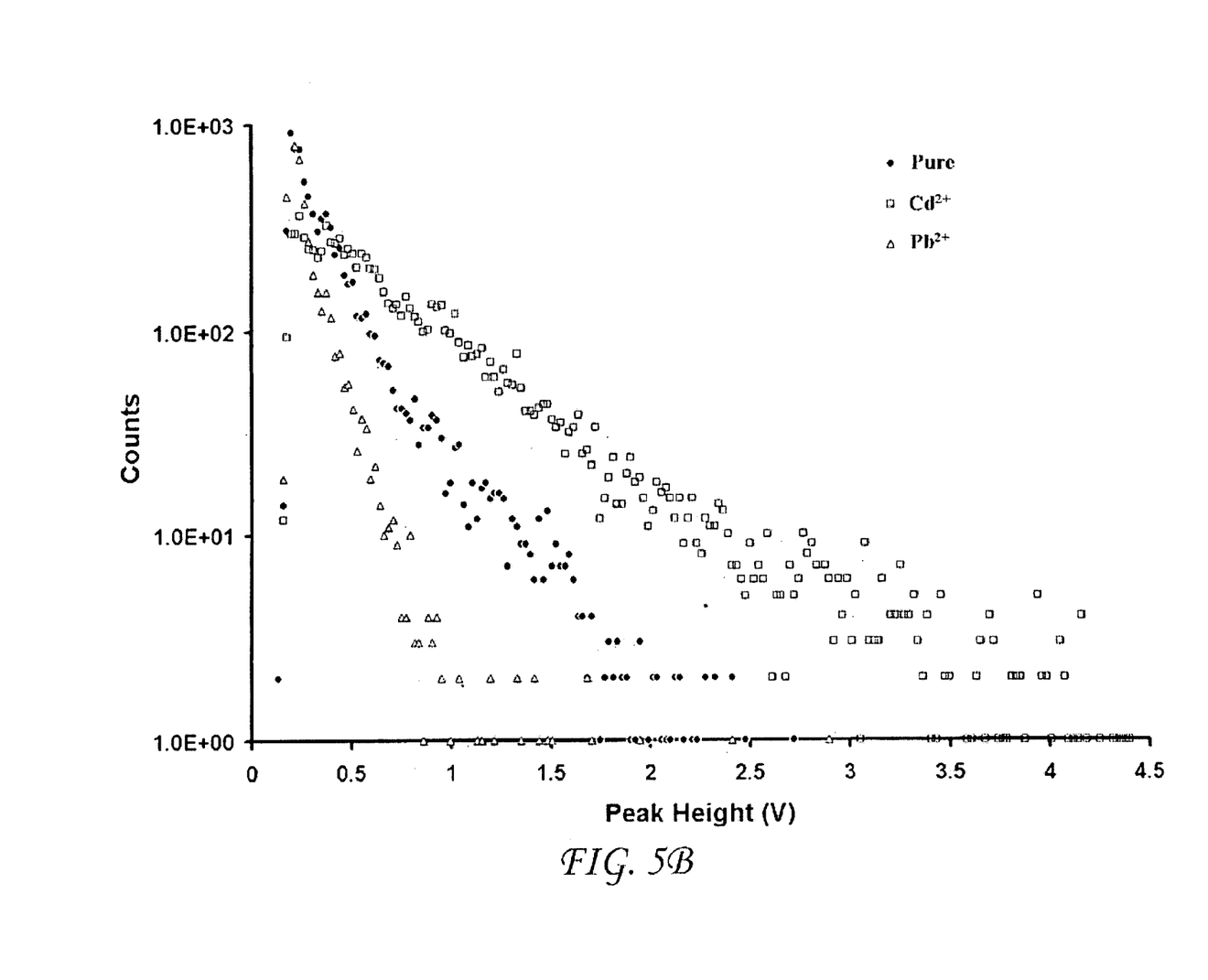
Figure 5C:
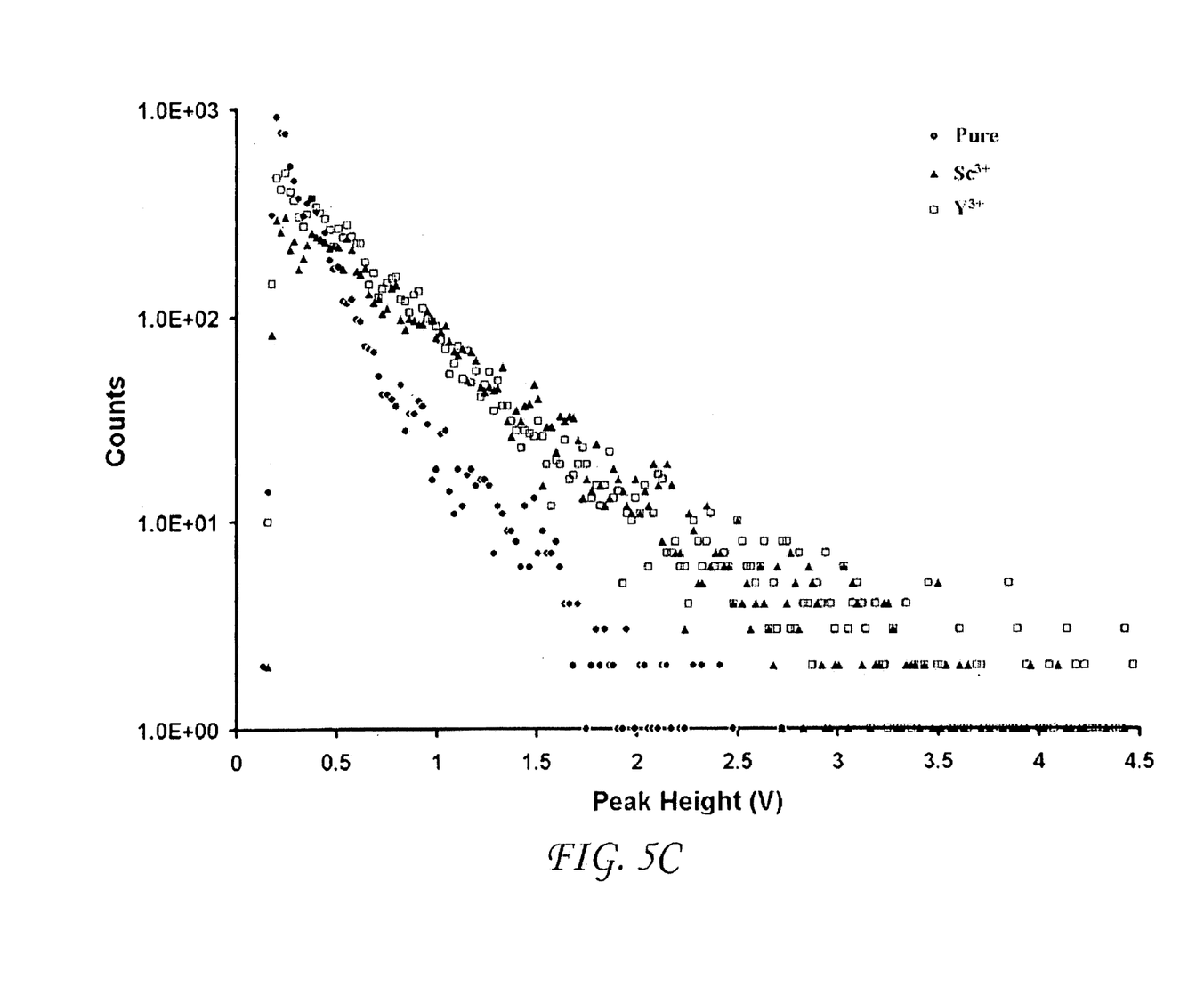
Figure 5D:
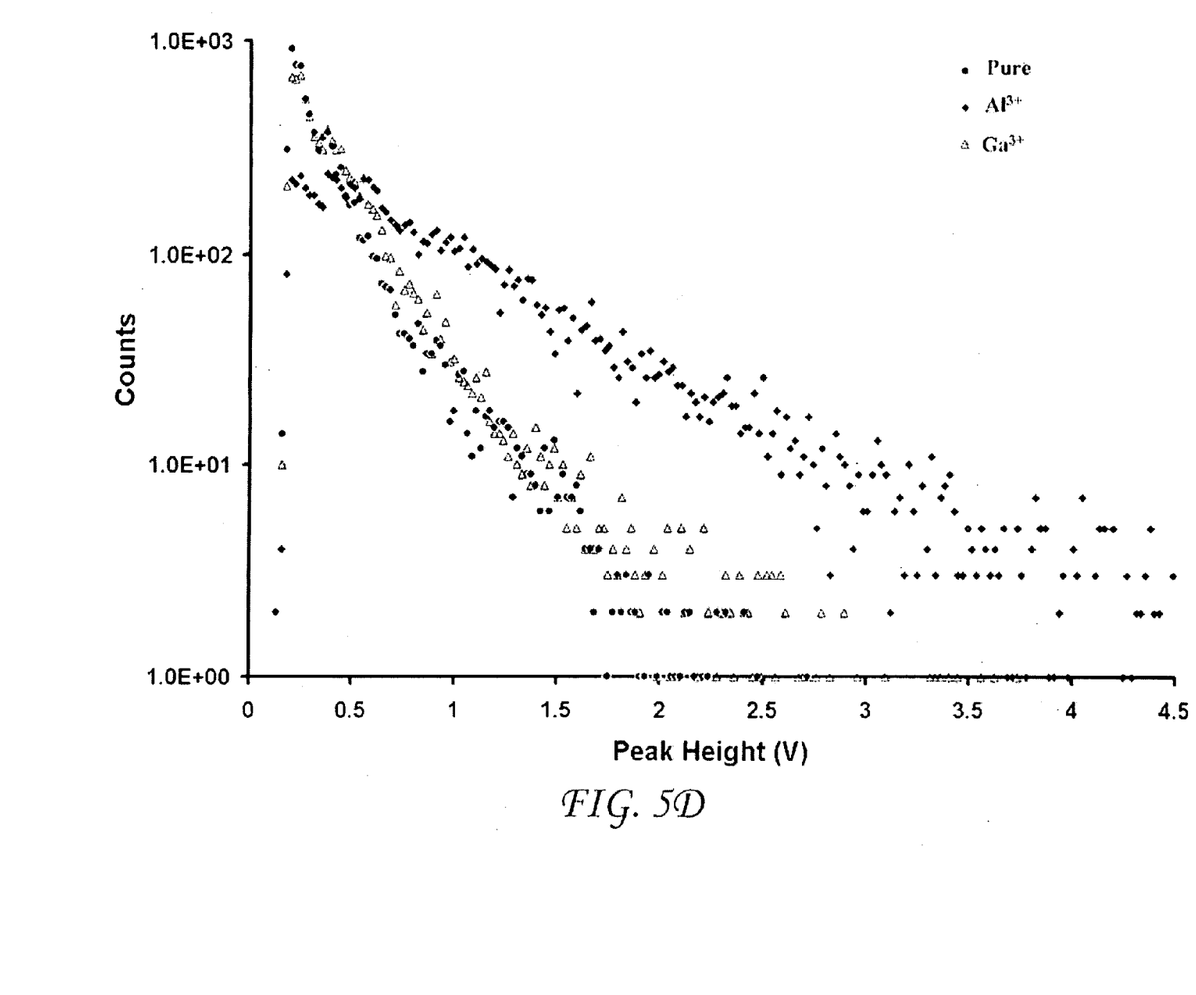
Figure 5E:
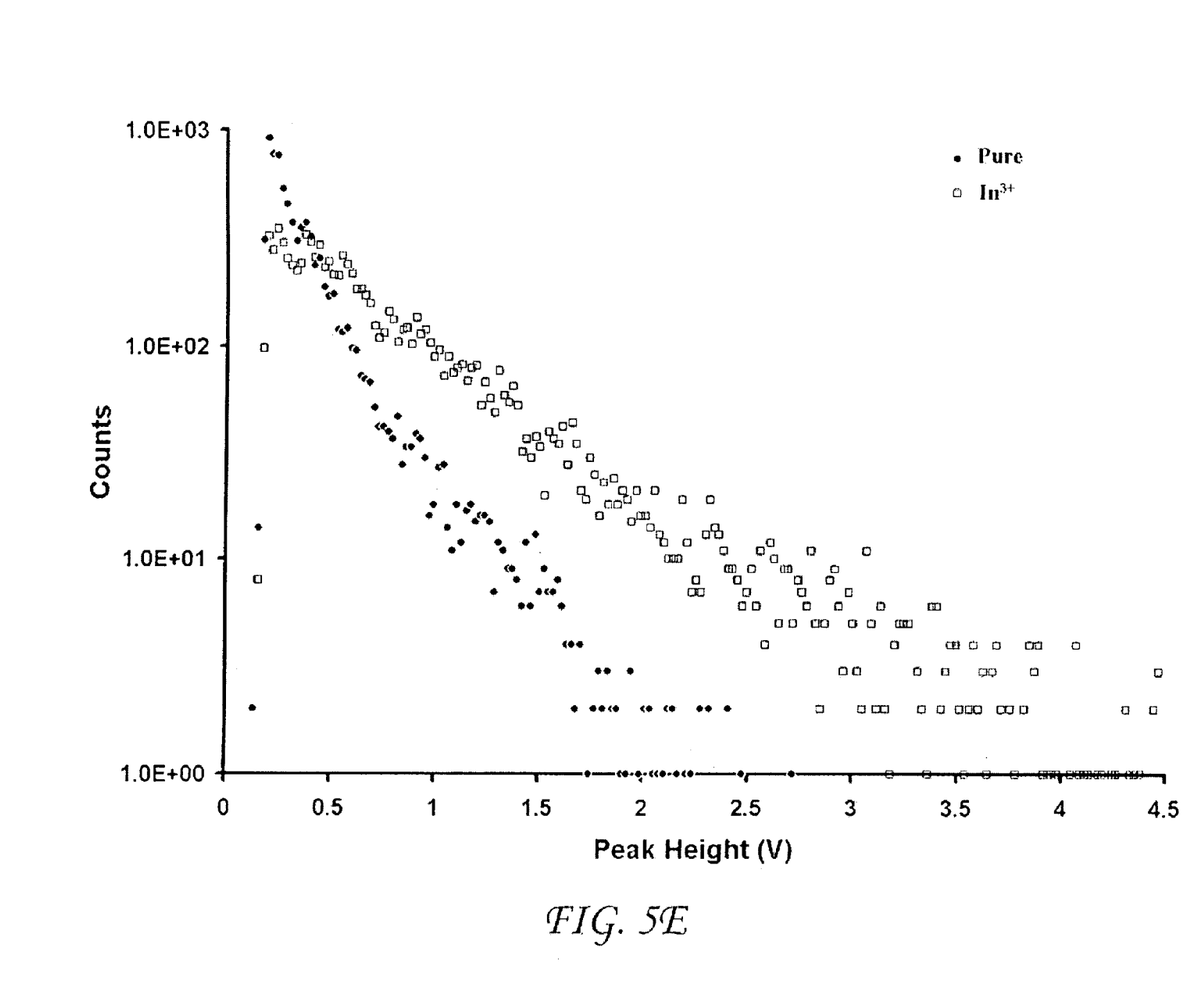
Figure 5F:
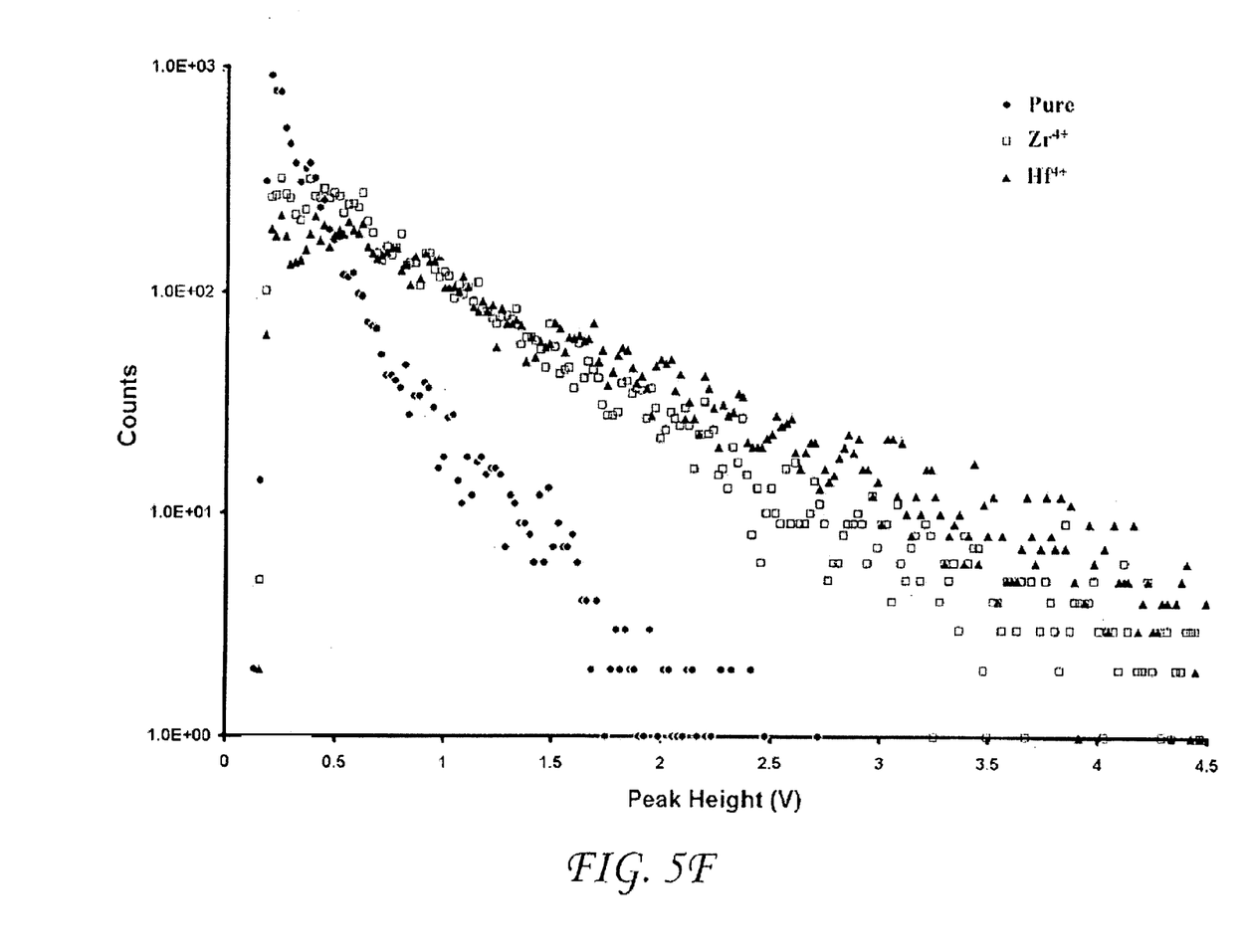

Hafnium and strontium doped ingots, shown in FIGS. 3B and 3C respectively, exhibited less cracking than their undoped counterparts, shown in FIG. 3A, indicating an increase in fracture strength. Illustrative fracture toughness measurements, estimated from Vickers microhardness tests, are shown in FIG. 4 and in TABLE 3 below, suggest at least an average 25% to 60% increase in strength over undoped lanthanide-halide crystals. In particular, undoped CeBr$_3$ crystals exhibited a fracture toughness of about 0.179 MPa·$\sqrt{m}$ to while CeBr$_3$ crystals doped with 1000 ppm of Hf exhibited a fracture toughness of 0.285 MPa·$\sqrt{m}$, i.e., or about a 60% increase in fracture strength. Moreover, Vickers microindentation hardness tests performed on a number of the crystals demonstrated that achieving up to a doubling in fracture toughness over similar undoped crystals was possible.

TABLE 3

Fracture strength as a % of CeBr$_3$ fracture strength

| CeBr$_3$ + Zn(II) (%) | CeBr$_3$ + Cd(II) (%) | CeBr$_3$ + Hf(IV) (%) |
|---|---|---|
| 1.0 | 2.46 | 2.47 |
| 1.2 | 1.9 | 1.82 |
| 1.22 | 1.89 | 1.54 |
| 1.27 | 1.83 | 1.44 |
| 1.33 | 1.66 | 1.4 |
| 1.4 | 1.39 | 1.22 |
| 1.58 | 1.19 | 1.18 |
| 1.65 | 1.15 | 1.14 |
|  | 1.13 | 1.1 |
|  |  | 1.01 |
|  |  | 0.94 |
|  |  | 0.85 |
| 1.33 ± 0.2 | 1.62 ± 0.42 | 1.34 ± 0.43 |

Figure 6:
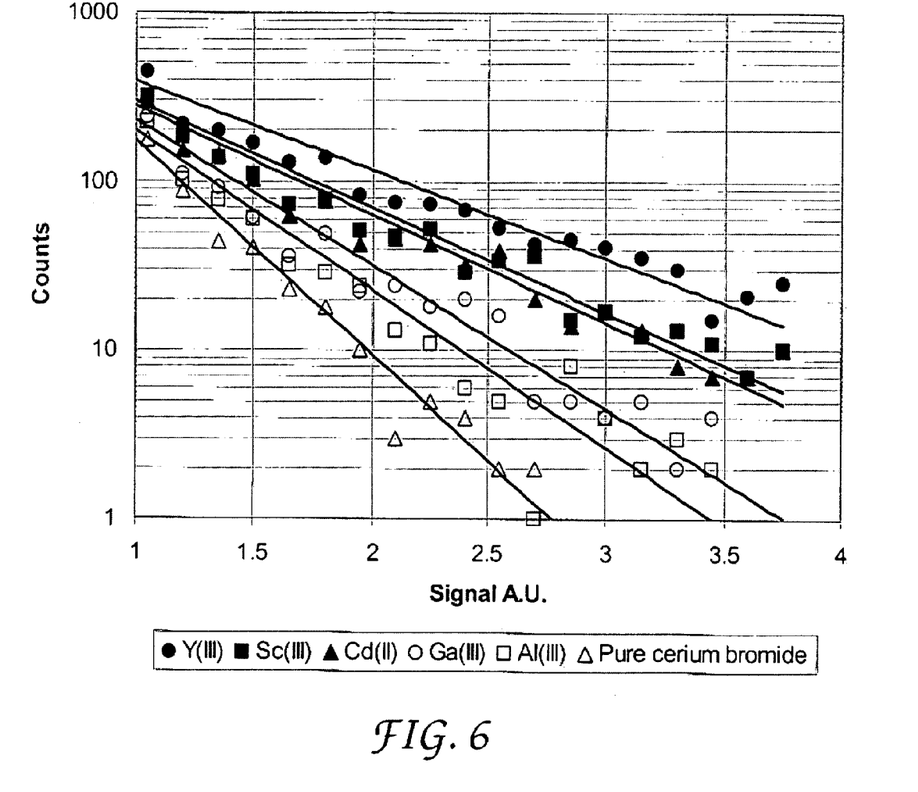
FIG. 6 shows the emission response of isovalent or aliovalently doped crystals to gamma radiation.

Serendipitously, the emission response of the isovalent and the aliovalently doped crystals was found to be enhanced when each was exposed to both UV radiation as shown in FIGS. 5A-5F, and to gamma radiation, shown in FIG. 6. That is, the applicants have discovered a class of scintillation materials which show enhanced light output above a baseline standard. It is significant that with 1% of Cd$^{-2}$ ions introduced into CeBr$_3$, the fluorescence spectrum was not substantially altered; indicating that at the anticipated ppm to levels required for strengthening, the scintillation properties of the parent crystal will be preserved. Other agents believed to be equally effective are the Group 2 elements up to barium, i.e., Be, Mg, Ca, Sr, and Ba; Group 3 elements Sc, Y, and La; Group 12 elements Zn, Cd, and Hg; and the Group 13 elements through indium B, Al, Ga, and In.

The addition of certain dopants, therefore, for the purpose of strengthening the crystal lattice of lanthanide halide scintillators has been shown to be effective at providing relatively large rugged single scintillator crystals with superior scintillation performance.

Having thus described exemplary embodiments of the present invention, it should be noted by those skilled in the art that the disclosures herein are exemplary only and that various other alternatives, adaptations, and modifications may be made within the scope of to the present invention. Accordingly, the present invention is not limited to the specific embodiments as illustrated herein, but is only limited by the following claims.

Finally, to the extent necessary to understand or complete the disclosure of the present invention, all publications, patents, and patent applications mentioned herein are expressly incorporated by reference therein to the same extent as though each were individually so incorporated.

What is claimed is:

1. A fracture-resistant, scintillation crystal, comprising a lanthanide-halide doped with one or more elements selected from the group or elements listed in Groups 2, 4, 12, 14 of the New IUPAC Periodic Table of the Elements, wherein the crystal exhibits a fracture toughness at least 50% greater than a fracture toughness of a corresponding undoped crystal.

2. The fracture-resistant, scintillation crystal of claim 1, wherein the dopant is a divalent cation.

3. The fracture-resistant, scintillation crystal of claim 2, wherein the dopant is selected from the list consisting of calcium, strontium, barium, zinc, cadmium, and lead.

4. The fracture-resistant, scintillation crystal of claim 1, wherein the dopant is a tetravalent cation.

5. The fracture-resistant, scintillation crystal of claim 4, wherein the dopant is zirconium or hafnium.

6. The fracture-resistant, scintillation crystal of claim 1, wherein the dopant is present in amounts of less than about 1500 ppm.

7. The fracture-resistant, scintillation crystal of claim 1, wherein the dopant is present in amounts of about 1000 ppm to about 500 ppm.

8. The scintillator crystal of claim 1, wherein the dopant is present in amounts of about 500 ppm to about 250 ppm.

9. The fracture-resistant, scintillation crystal of claim 1, wherein the lanthanide-halide is cerium (III) bromide.

10. The fracture-resistant, scintillation crystal of claim 9, wherein the average measured fracture toughness is equal to or greater than about 0.25 MPa$\sqrt{m}$.

11. A fracture-resistant, scintillation crystal, comprising cerium (III) bromide doped with a divalent or a tetravalent cation, wherein the cation is present in the crystal at a concentration of less than about 1500 ppm to greater than about 200 ppm, wherein the to scintillation crystal exhibits a fracture toughness of at least 50% greater than a fracture toughness of a corresponding undoped cerium (III) bromide crystal.

12. A method for preparing a fracture-resistant, scintillation crystal, comprising the steps of:
    combining a quantity of a salt of an element selected form the list of elements is consisting of calcium, strontium, barium, zirconium, hafnium, zinc, cadmium, and lead, and a quantity of an lanthanide-halide to provide a combined material;
    placing the combined material into an elongated crucible, wherein the crucible is chemically inert with respect to the element and the lanthanide-halide;
    melting the combined material in a vacuum or under an inert atmosphere;
    cooling the melted material to room temperature, wherein cooling takes place from one end and transitions to nucleate a single crystal at the one end, wherein the single crystal subsequently grows along the length of the elongated crucible as the melted material cools.

13. The method of claim 12, wherein the element is present in amounts of less than about 1500 ppm.

14. The method of claim 12, wherein the element is present in amounts of about 1000 ppm to about 500 ppm.

15. The method of claim 12, wherein the element is present in amounts of about 500 ppm to about 250 ppm.

16. The method of claim 12, wherein the lanthanide-halide is cerium (III) bromide.

17. The fracture-resistant, scintillation crystal of claim 16, wherein the average measured fracture toughness is equal to or greater than about 0.25 MPa$\sqrt{m}$.

18. A method for enhancing the fluorescence of a cerium (III) bromide crystal scintillator, comprising the step of introducing a quantity of a dopant element selected from the list of elements consisting of Ca, Sr, Ba, Sc, Y, Zr, Hf, Zn, Cd, Al, Ga, In, and Sn into the cerium (III) bromide crystal.

\* \* \* \* \*